Patented Jan. 2, 1945

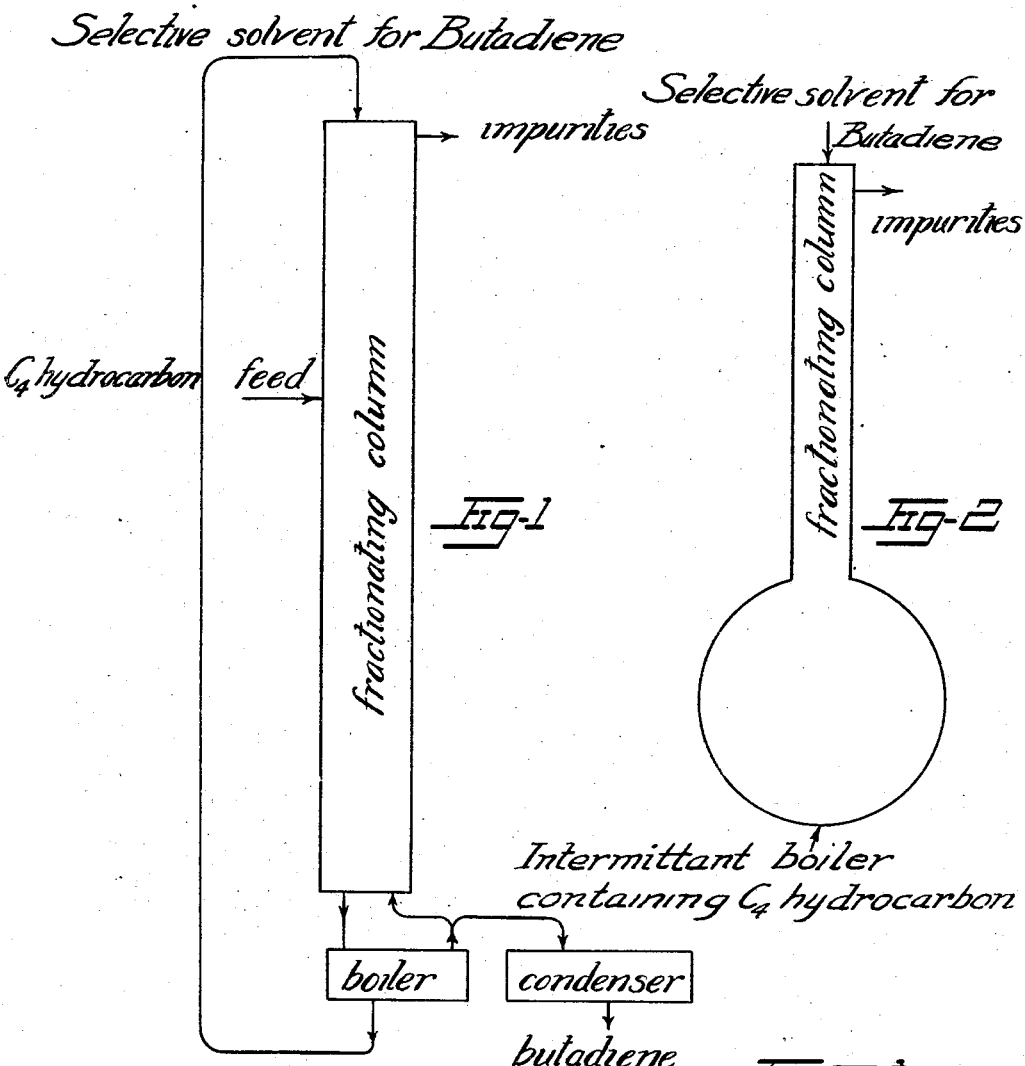

2,366,362

UNITED STATES PATENT OFFICE 2,366,362

PURIFICATION OF BUTADIENE

Waldo L. Semon, Silver Lake, and David Craig, Cuyahoga Falls, Ohio, assignors to The B. F. Goodrich Company, New York, N. Y., a corporation of New York Application November 3, 1939, Serial No. 302,702

6 Claims. (Cl. 202—41)

This invention relates to the separation of substantially constant boiling mixtures and particularly the separation of butadiene from butylene and butane.

It is known that butadiene can be separated from butylenes and butanes by distilling through an efficient fractionating column down which flows a suitable solvent, the butadiene being taken up by the solvent, and the other hydrocarbons being discharged at the top of the column. Previous workers have made a number of different suggestions as to suitable solvents for this kind of operation. One suggestion has been that the solvent should be one which forms separate liquid layers when shaken with a liquid mixture of butadiene and butylene. Another suggestion has been that the solvent should have a high dielectric constant. Another suggestion has been that the solvent should be miscible with both water and benzene.

We have discovered that none of the properties suggested by previous workers and enumerated above have any true relationship to selectivity of the solvents and their consequent utility in the separation of butadiene from butylene and butane, but that a class of materials which does not conform at all to these supposed requirements is of the greatest value for this purpose. This class consists of liquid aldehydes and ketones containing between ten and thirty percent of oxygen, but containing no other element except carbon and hydrogen. This class contains such aldehydes as propionaldehyde, butyraldehyde (normal and iso), valeraldehyde, heptaldehyde, octyl aldehyde, crotonaldehyde, alpha-ethyl hexenal, benzaldehyde, cinnamaldehyde, and such ketones as acetone, methyl ethyl ketone, methyl propyl ketone, methyl isobutyl ketone, diethyl ketone, dipropyl ketone, mesityl oxide, cyclohexanone, acetophenone and diacetone.

This class of aldehydes and ketones plainly does not conform to the supposed requirements stated by previous workers. The aldehydes and ketones are generally completely miscible with liquid butadiene or butylene or any mixture thereof, and therefore incapable of forming two liquid layers. Their dielectric constants are not particularly high. With one or two exceptions they are not miscible with water, and most of them are not even very soluble in water. They are nevertheless excellent selective solvents for butadiene and can be used to bring about any desired degree of separation of butadiene from butylene and butane, by distilling the mixture of these hydrocarbons through an efficient fractionating column down which the solvent flows.

In the enrichment of butadiene by this process, an efficient separation is not attained unless the rate of flow of solvent, compared to the rate of removal of impurities, exceeds a critical ratio, as is pointed out in detail in our copending application Serial No. 297,342 filed September 30, 1939. This critical ratio, for satisfactorily selective solvents such as the aldehydes and ketones of this invention, is a number between 10 and 20, hence the ratio chosen for actual operation will ordinarily be from 15 to 20 or perhaps somewhat higher. These solvents may be employed either at room temperature or at temperatures which are somewhat higher or lower. Good results are obtained by choosing a temperature such that the vapors of the materials to be separated are about 15 to 50% soluble in the solvent used.

The apparatus used may be a conventional fractionating column containing bubble cap plates, or any equivalent construction. For continuous separation of 50% butadiene, the remainder consisting of a mixture of butylenes and butanes, into a 95% butadiene fraction and a 5% butadiene fraction, a column containing thirty plates above the feed and thirty plates below the feed such as is diagrammatically shown in Fig. 1 will ordinarily be adequate. For an intermittent operation a somewhat shorter column, say of thirty or thirty-five plates, such as is diagrammatically shown in Fig. 2, may be used. In addition to the usual adjuncts of fractionating stills, the apparatus need only be provided with means for supplying a constant flow of the desired solvent, and if it is a continuous still, with means for stripping the purified butadiene from the solvent before it is recirculated.

As a specific example of one embodiment of the invention, 50% butadiene vapor is fed at the center of a sixty-plate bubble cap column such as that of Fig. 1 and butyraldehyde is supplied at the top of the column in quantities ten times the weight of the feed (or twenty times the weight of the impurities removed at the top of the column). The liquid flowing from the bottom of the column is heated to boil out the purified butadiene and is recirculated, while a portion of the butadiene vapor is returned to the bottom of the column to maintain the saturation of the descending solvent, the remainder of the butadiene recovered from the solvent being condensed and removed as the product. In this manner the butadiene is easily enriched to 95% concentration, while the impurities carry away only 5% of butadiene. Similar results may be obtained with valeraldehyde, crotonaldehyde, alpha-ethyl hexenal, acetone, mesityl oxide, or any other of the class of materials set forth above.

As another specific example, 60% butadiene is mixed with twice its weight of methyl ethyl ketone in the kettle of an intermittent still having thirty bubble cap plates, such as that of Fig. 2. Slow distillation of the butadiene is started and methyl ethyl ketone is supplied at the top of the column in quantities thirty times the weight of impurities removed. The initial fractions amounting to 35% of the batch have a concentration of only 1 to 2.5% butadiene. An intermediate fraction (11% of the batch) contains 23% butadiene and is saved for re-running with a later batch. Finally, 51% of the batch is recovered as 96% butadiene. Similar results may be obtained with acetone, mesityl oxide, butyraldehyde, or any other of the class of materials set forth above.

We claim:

1. A process for separating butadiene from a mixture of four-carbon hydrocarbons having a substantially constant boiling point, comprising distilling the mixture through an efficient fractionating column down which flows a stream of a solvent from the class consisting of liquid aldehydes and ketones containing between ten and thirty percent of oxygen but no other element except carbon and hydrogen, the solvent being supplied at a rate in excess of the critical rate above which further increase does not appreciably change the degree of separation, and recovering enriched butadiene from the solvent.

2. A process for separating butadiene from a mixture of four-carbon hydrocarbons having a substantially constant boiling point, comprising distilling the mixture through an efficient fractionating column down which flows a stream of a liquid aldehyde containing between ten and thirty percent of oxygen but no other element except carbon and hydrogen, the liquid being supplied at a rate in excess of the critical rate above which further increase does not appreciably change the degree of separation, and recovering enriched butadiene from the aldehyde.

3. A process for separating butadiene from a mixture of four-carbon hydrocarbons having a substantially constant boiling point, comprising distilling the mixture through an efficient fractionating column down which flows a stream of butyraldehyde, the butyraldehyde being supplied at a rate in excess of the critical rate above which further increase does not appreciably change the degree of separation, and recovering enriched butadiene from the butyraldehyde.

4. A process for separating butadiene from a mixture of four-carbon hydrocarbons having a substantially constant boiling point, comprising distilling the mixture through an efficient fractionating column down which flows a stream of a liquid ketone containing between ten and thirty percent of oxygen but no other element except carbon and hydrogen, the liquid being supplied at a rate in excess of the critical rate above which further increase does not appreciably change the degree of separation, and recovering enriched butadiene from the ketone.

5. A process for separating butadiene from a mixture of four-carbon hydrocarbons having a substantially constant boiling point, comprising distilling the mixture through an efficient fractionating column down which flows a stream of methyl ethyl ketone, the methyl ethyl ketone being supplied at a rate in excess of the critical rate above which further increase does not appreciably change the degree of separation, and recovering enriched butadiene from the methyl ethyl ketone.

6. A process for separating butadiene from a mixture of four-carbon hydrocarbons having a substantially constant boiling point, comprising distilling the mixture through an efficient fractionating column down which flows a stream of acetone, the acetone being supplied at a rate in excess of the critical rate above which further increase does not appreciably change the degree of separation, and recovering enriched butadiene from the acetone.

WALDO L. SEMON.
DAVID CRAIG.